(12) United States Patent
Fujimoto et al.

(10) Patent No.: US 7,641,238 B2
(45) Date of Patent: Jan. 5, 2010

(54) VEHICLE WHEEL FENDER FLAP

(75) Inventors: Yukinori Fujimoto, Kakogawa (JP); Hideo Beppu, Ibaraki (JP); Katsuji Fujii, Tatsuno (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 376 days.

(21) Appl. No.: 11/506,558

(22) Filed: Aug. 18, 2006

(65) Prior Publication Data

US 2007/0046016 A1    Mar. 1, 2007

(30) Foreign Application Priority Data

Aug. 25, 2005  (JP) .............................. 2005-244511

(51) Int. Cl.
  *B62D 25/16*  (2006.01)
  *B62D 25/18*  (2006.01)
(52) U.S. Cl. ........................................ 280/851; 40/200
(58) Field of Classification Search ................. 280/851; 40/200, 201, 202, 203, 204, 205, 206, 207, 40/208, 209, 210, 211
See application file for complete search history.

(56) References Cited

U.S. PATENT DOCUMENTS

| 3,830,520 | A | * | 8/1974 | Kelly | 280/851 |
| 3,877,722 | A | * | 4/1975 | Conner | 280/154 |
| 4,413,839 | A | * | 11/1983 | McCain | 362/485 |
| 5,048,868 | A | * | 9/1991 | Arenhold | 280/848 |
| 5,050,908 | A | * | 9/1991 | Betts | 280/851 |
| 5,816,617 | A | * | 10/1998 | Huang | 280/851 |
| 6,257,362 | B1 | * | 7/2001 | Scherbarth | 180/219 |

FOREIGN PATENT DOCUMENTS

JP        2004-224176        12/2004

* cited by examiner

*Primary Examiner*—Paul N Dickson
*Assistant Examiner*—Bryan A Evans

(57) ABSTRACT

To provide a wheel fender flap that is less susceptible to swinging during the use thereof and capable of retaining an appealing feature, the wheel fender flap arranged to confront a vehicle wheel, includes a generally elongated flap body supported by a vehicle body structure and a reinforcement member separate from the flap body, but used to increase the rigidity of the flap body.

10 Claims, 5 Drawing Sheets

VEHICLE WHEEL FENDER FLAP

BACKGROUND OF THE INVENTION

1. Field of the Invention

The present invention relates to a wheel fender flap that is used over each wheel of a motor vehicle.

2. Description of the Prior Art

As is well known to those skilled in the art, motorcycles, three-wheeled motor vehicles and four-wheeled off-road vehicles are equipped with flaps over wheels of those motor vehicles so as to block the splashing of water and/or mud. An exemplary motorcycle wheel fender flap is disclosed in, for example, the Japanese Laid-open Patent Publication No. 2004-224176, published Aug. 12, 2004. Those flaps are generally made of a synthetic resin.

The wheel fender flaps of the kind referred to above are apt to swing or shake when the motor vehicles drive on a rough road. To suppress the swinging, it may be contemplated to form reinforcement ribs integrally with the wheel fender flaps during the molding of the latter. However, the molding of the reinforcement ribs integrally with the wheel fender flaps may often leave pull-ins caused by thermal shrinkage in surfaces of the eventually molded wheel fender flaps, which lead to deterioration in appearance of the wheel fender flaps.

SUMMARY OF THE INVENTION

In view of the foregoing, the present invention has been devised to provide an improved wheel fender flap that is less susceptible to swinging during driving and, yet, capable of retaining an appealing feature.

In order to accomplish the above described object of the present invention, there is, in accordance with the present invention, provided a wheel fender flap that is positioned confronting a vehicle wheel, which flap includes a generally elongated flap body supported by a member forming a vehicle body structure and a reinforcement member separate from the elongated flap body, but used to reinforce the elongated flap body.

According to the present invention, the wheel fender flap is so designed that the flap body is reinforced by the reinforcement member to increase the rigidity of the wheel fender flap as a whole. Accordingly, the wheel fender flap of the present invention is advantageously prevented from swinging particularly in a direction up and down with respect to the road surface during the drive of the motor vehicle. Also, since the reinforcement member is a member formed separate from the flap body, the possibility of formation of pull-ins by shrinkage, which is often observed when the wheel fender flap is formed integrally with the reinforcement ribs as discussed hereinbefore, can advantageously be eliminated, allowing the wheel fender flap of the present invention to provide an appealing appearance. Considering that the flap body is reinforced by the reinforcement member, a flap body having a relatively low rigidity can be utilized in the practice of the present invention, with the flexibility of design increased consequently.

In a preferred embodiment of the present invention, the reinforcement member may have a connecting area at an upper end thereof, which area is connected to the elongated flap body by means of a first connecting member which concurrently secures the elongated flap body to the member forming the vehicle body structure. According to this preferred feature, the same connecting member can be concurrently utilized to connect the reinforcement member with the elongated flap body together and also to connect the reinforcement member and the elongated flap body together with the vehicle body structure and, accordingly, not only can the number of component parts used be reduced, but also the structure can be simplified.

It is to be noted that the vehicle body structure referred to hereinbefore and hereinafter is intended to encompass a motor vehicle structure excluding a vehicle engine, a power transmission device, and vehicle electric appliances, but including a motor vehicle frame structure and a mechanical vehicle skeleton supported thereby such as, in the case of a motorcycle, a front fork assembly, a fairing, a side cover, a tail cover and a rear fender.

In another preferred embodiment of the present invention, the reinforcement member may have at least one connecting area, which is connected to the elongated flap body together with a separate component part by means of a second connecting member. According to this preferred feature, reduction of the number of component parts used and simplification of the structure can be achieved by the concurrent utilization of the same connecting member for the reinforcement member and one or more other component parts. An example of such separate component part is a license plate.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Figure 1:
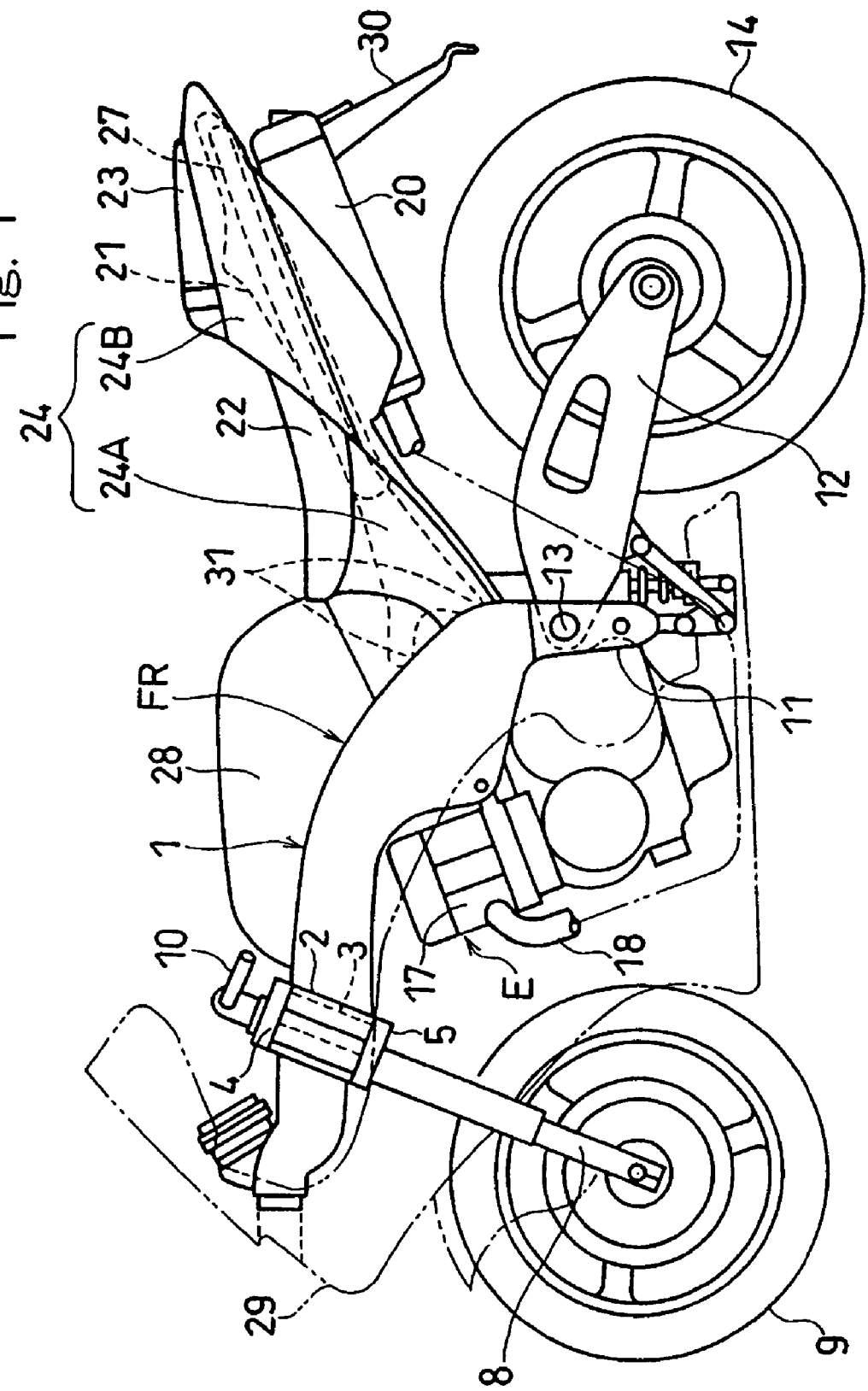
FIG. 1 is a left side view of a motorcycle equipped with a wheel fender flap according to a preferred embodiment of the present invention.

Preferred embodiments of the present invention will now be described in detail with reference to the accompanying drawings. In particular, FIG. 1 illustrates a motorcycle equipped with a wheel fender flap according to a first preferred embodiment of the present invention, shown in a left side view with respect to the direction of forward drive of the motorcycle. The motorcycle shown therein is an exemplary one of various motor vehicles, to which the present invention is applicable and includes a motorcycle frame structure FR made up of a main frame 1, forming a front part of the frame structure FR.

The main frame 1 has a head tube 2 rigidly secured to a front portion thereof, and a steering shaft 3 is rotatably inserted in and is supported by the head tube 2. Upper and lower brackets 4 and 5 are supported by the head tube 2 through the steering shaft 3, and front fork members 8 are supported by the upper and lower brackets 4 and 5. A front wheel 9 is rotatably carried by and between respective lower ends of the front fork members 8, and a handlebar 10 is rigidly mounted on the upper bracket 4 for movement together therewith.

A swingarm bracket 11 is provided at a rear lower portion of the main frame 1, and a swingarm 12 is connected with the swingarm bracket 11 through a pivot pin 13 for swing movement. A rear drive wheel 14 is rotatably supported by a rear end of the swingarm 12. A multi-cylinder engine E is supported by the main frame 1 at a position below an intermediate portion of the main frame 1. A cylinder head 17 of the engine E has a plurality of exhaust pipes 18 fluidly connected therewith, which are in turn fluidly connected with mufflers 20 disposed on respective sides of a rear portion of the motorcycle frame structure FR.

A rear frame 21 is connected to a rear portion of the main frame 1 and forms a rear portion of the frame structure FR. A rider's seat 22 and a fellow passenger's seat 23 are mounted on the rear frame 21. This rear frame 21 also supports a rear fender assembly 27 positioned above the rear drive wheel 14, the details of which will be described subsequently. A fuel tank 28 is mounted on the motorcycle frame structure FR at a location above the main frame 1 and between the handlebar 10 and the rider's seat 22. A front portion of the motorcycle frame structure FR is provided with a fairing 29, shown by the phantom line, which is so shaped and so positioned as to cover a front to side region of the motorcycle frame structure FR, including a front area forwardly of the handlebar 10 and side areas generally laterally of the motorcycle engine E.

Except for the areas of the rear frame 21, where the rider's seat 22 and the fellow passenger's seat 23 are disposed, opposite lateral areas of the rear frame 21 is covered by a front cover 24A and a rear cover 24B, which form respective parts of a tail covering 24. A wheel fender flap 30 is connected with a rear lower portion of the rear fender assembly 27 so as to extend rearwardly downwardly therefrom to confront the rear wheel 14 thereby covering above and rearwardly of the rear wheel 14.

Figure 2:
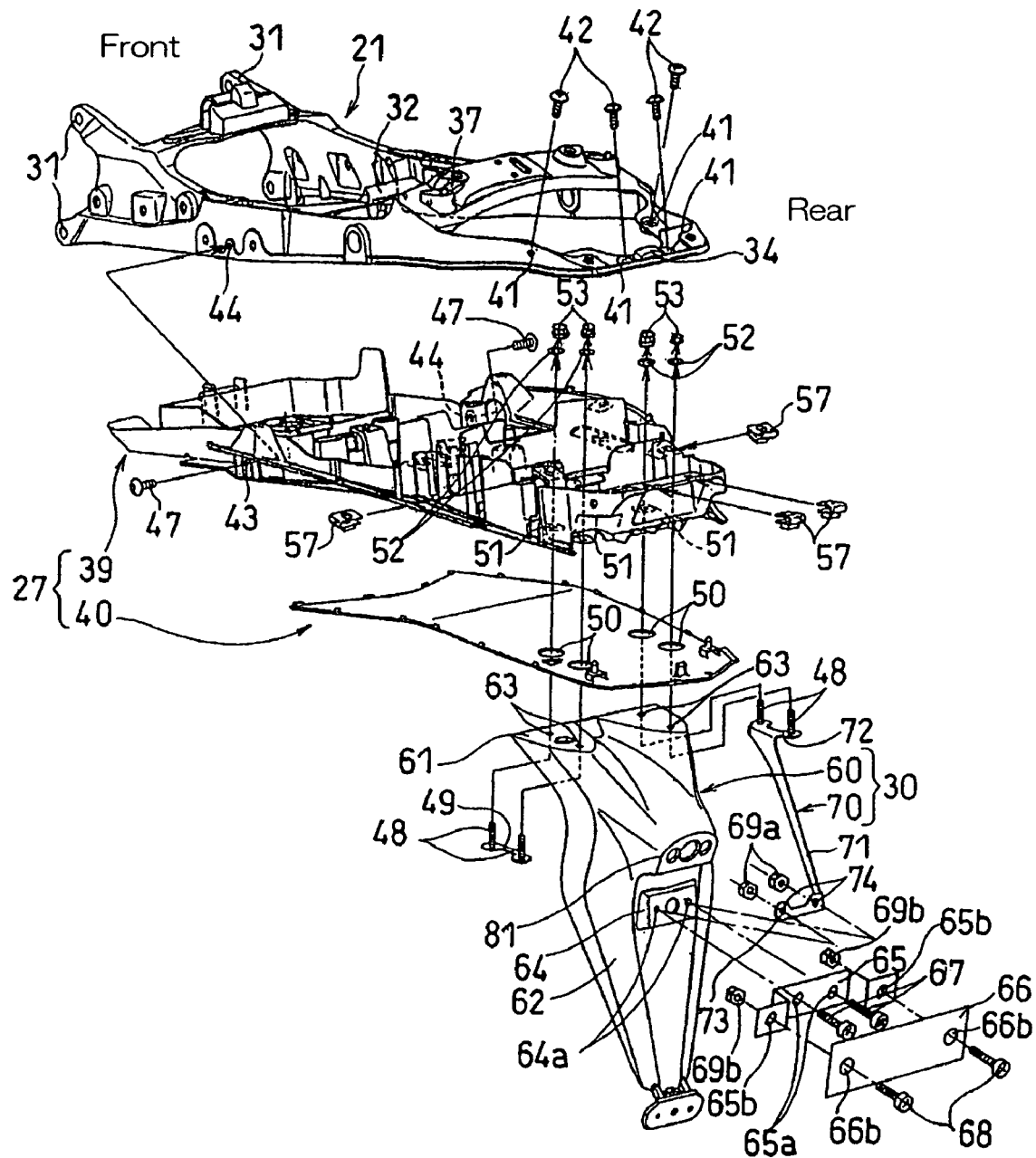
FIG. 2 is a perspective exploded view of a motorcycle rear fender structure shown together with the wheel fender flap shown in FIG. 1.

FIG. 2 illustrates a perspective exploded view showing a portion of the rear frame 21, where the rear fender assembly 27 and the wheel fender flap 30 are secured to the rear frame 21. The rear frame 21 is made of a metallic material such as an aluminum alloy and is formed in a generally rectangular frame-like shape, when viewed from top. This rear frame 21 is formed at its front end with a plurality of, for example, four (although only three of them are shown) connecting pieces 31 through which the rear frame 21 is rigidly connected with the main frame 1 (FIG. 1) by means of corresponding screw members (not shown) so as to extend rearwardly from the main frame 1. This rear frame 21 is also formed with a front hook 32, with which an engagement pawl provided in the rider's seat 22 is engaged, and a rear hook 34, with which the fellow passenger's seat 23 is engaged, to thereby support the seats 22 and 23 on the rear frame 21.

The rear fender assembly 27 is of a double layered structure including an upper fender 39 and a lower fender 40 connected to a lower region of the upper fender 39 and both made of a synthetic resin. The upper fender 39 is fixedly secured to the rear frame 21 by means of a plurality of, for example, four, set screws 42 which are inserted through corresponding mounting holes 41, defined in a rear portion of the rear frame 21, and are then threaded firmly into associated clip-on nuts 57 then mounted on the upper fender 39. Also, this upper fender 39 has front left and right side walls fixedly secured to the rear frame 21 by means of fitting screws 47 inserted through corresponding mounting holes 43, defined in the upper fender 39, and then firmly threaded into screw holes 44 defined in the rear frame 21.

The fender flap 30 referred to previously includes an elongated flap body 60 and a reinforcement member 70 for reinforcing the elongated flap body 60. The reinforcement member 70 is formed independent of and separate from the elongated flap body 60 and fitted to the elongated flap body 60 to enhance the rigidity thereof. The elongated flap body 60 is made of, for example, a synthetic resin. On the other hand, the reinforcement member 70 is made of, for example, a metallic material and is secured to the inside (a front side) of the elongated flap body 60.

As best shown in FIG. 2, the elongated flap body 60 is made up of an upper wall 61 and a major wall 62 integral with the upper wall 61 and extending from a rear portion of the upper wall 61 in a direction downwardly therefrom. Left and right sides of the upper wall 61 has pairs of mounting holes 63 defined one pair for each side thereof, in total number of four. A rear intermediate portion of the major wall 62 is formed with a license plate mount 64 defined therein so as to protrude rearwardly with respect to the direction of forward drive of the motorcycle. As a matter of design, a license plate 66 is fitted to this license plate mount 64 by means of a license plate mounting bracket 65. A portion of the major wall 62 above the license plate mount 64 is formed with an illuminator mount 81 for accommodating a license plate illuminator.

A portion of the license plate mount 64 intermediate of the widthwise direction of the motorcycle is formed with a plurality of, for example, two, mounting holes 64a defined therein so as to be juxtaposed in the widthwise direction of the motorcycle and, similarly, a portion of the license plate mounting bracket 65 intermediate of the widthwise direction of the motorcycle is formed with an equal number of mounting holes 65a defined therein in alignment with the mounting holes 64a in the license plate mount 64. Those mounting holes 64a and 65a are utilized to receive therein respective mounting screws 67 used to secure the license plate mounting bracket 65 to the license plate mount 64. Also, each of the license plate mounting bracket 65 and the license plate 66 has left and right end portions formed with respective mounting holes 65b or 66b for receiving corresponding mounting screws 68 used to secure the license plate 66 to the license plate mounting bracket 65. Thus, it will readily be seen that the license plate 66 is secured to the license plate mount 64 through the intervention of the license plate mounting bracket 65.

The elongated flap body 60 referred to above is supported by, or secured to the rear fender 27, which forms a member of a vehicle body structure, by means of mounting screws 48 passed from below through the respective mounting holes 63 defined in the top wall 61 in a manner, which will now be described.

Figure 3:
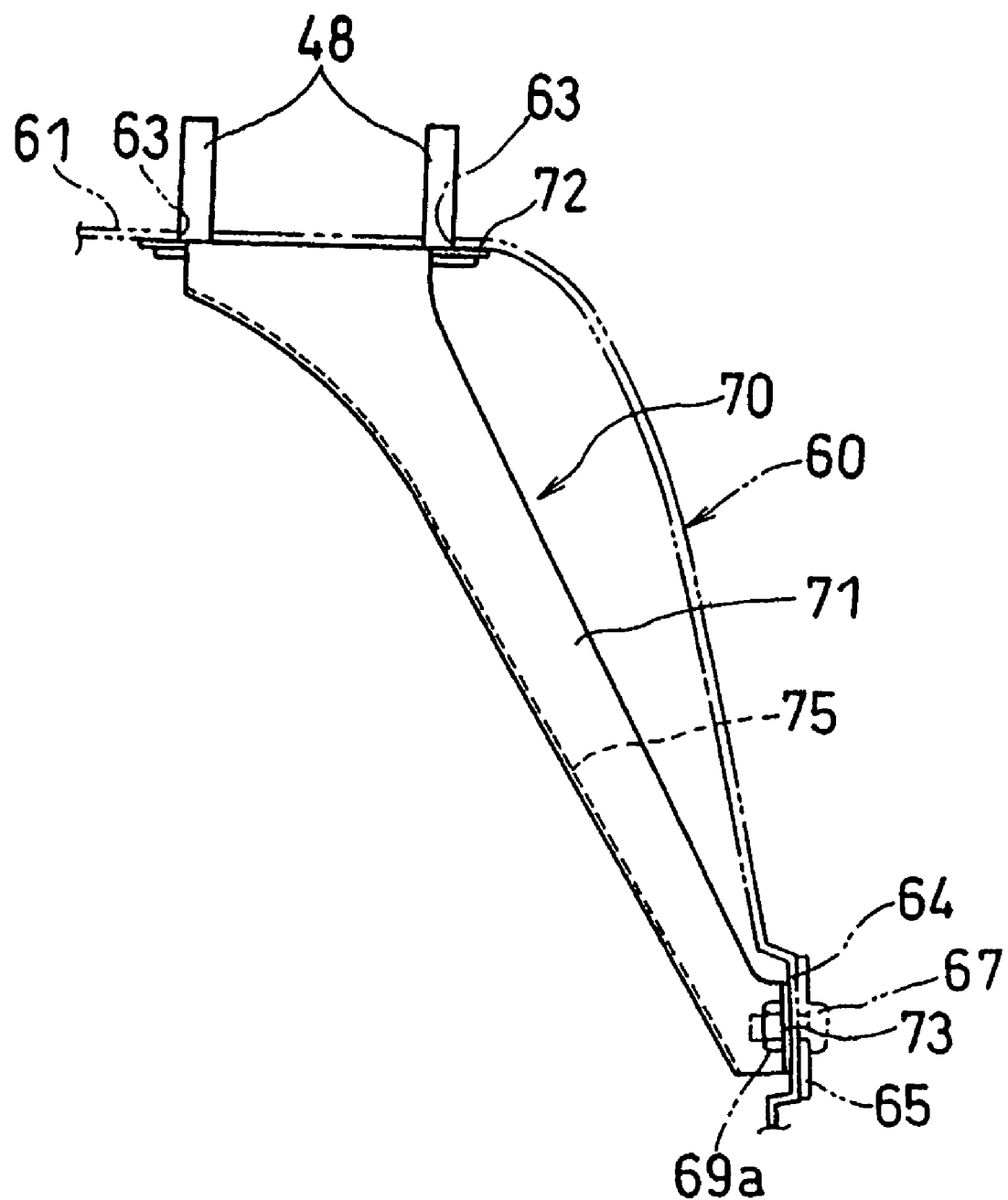
FIG. 3 is a left side view of a reinforcement member employed in the wheel fender flap shown in FIG. 2.
Figure 4:
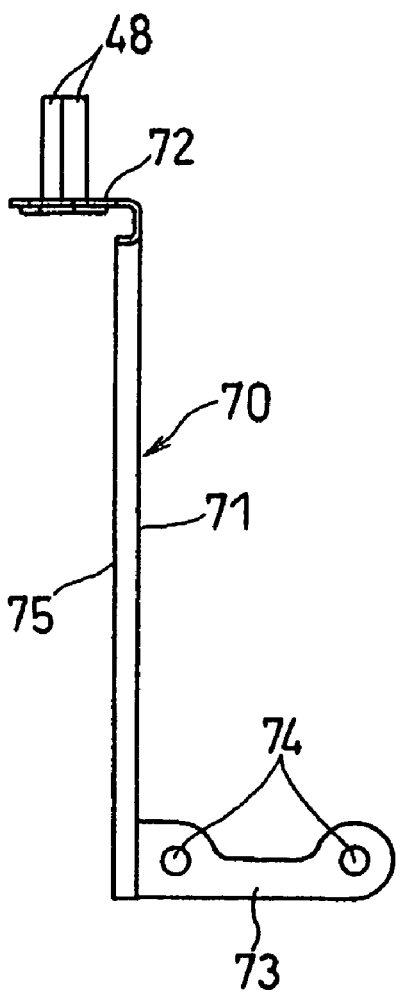
FIG. 4 is a front elevational view of the reinforcement member.
Figure 5:
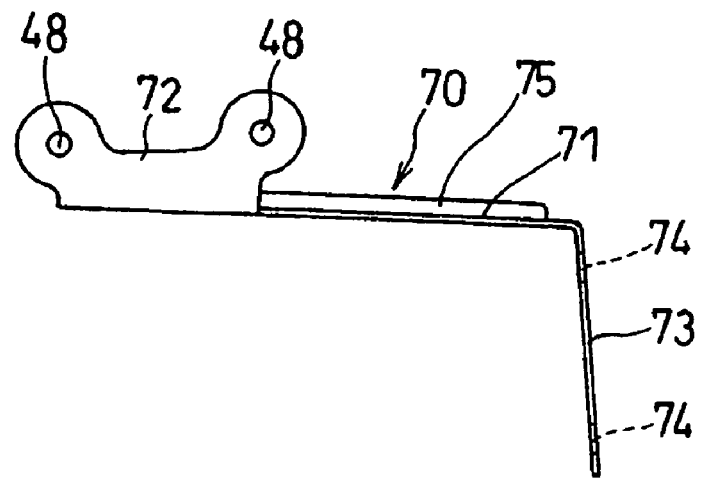
FIG. 5 is a plan view of the reinforcement member shown in FIG. 2.

FIGS. 3 to 5 illustrate the reinforcement member 70 as viewed from side, front and top, respectively. As shown in FIG. 3, the reinforcement member 70 is made up of a substantially elongated body 71, a first or top mounting tab or piece 72 formed by bending an upper end portion of the elongated body 71, and a second or bottom mounting tab or piece 73 formed by bending a lower end portion of the elongated body 71.

The first mounting tab 72 has a set of, for example, two mounting screws 48 and 48 passed from below through such first mounting tab 72 so as to protrude upwardly and then fixed by welding to the first mounting tab 72. Those mounting screws 48 and 48 are spacedly positioned on a right side of the vehicle body structure and in a direction conforming to the longitudinal sense of the motorcycle. On the other hand, as best shown in FIG. 4, the second mounting tab 73 is formed with a plurality of, for example, two, mounting holes 74 defined therein and positioned spacedly in a direction substantially perpendicular to the longitudinal sense of the motorcycle. To increase the rigidity of the elongated body 71 of the reinforcement member 70, a front edge of the elongated body 71 is bent to define a rib 75. As shown in FIG. 5, the first mounting tab 72 lies generally horizontally and the second mounting tab 73 lies generally vertically and extends in a direction widthwards of the motorcycle frame structure FR.

Another set of mounting screws 48 and 48 spacedly positioned on a left side of the vehicle body structure and in a direction confirming to the longitudinal sense of the motorcycle are, after having passed from below through a backing plate 49 so as to protrude upwardly, fixed by welding to the backing plate 49.

The mounting screws 48 fixed to the backing plate 49 and the first mounting tab 72 of the reinforcement member 70 are passed through the mounting holes 63, defined in the top wall 61 of the elongated flap body 60, and then through corresponding insertion holes 50, defined in the lower fender 40, and finally through fixing holes 51 defined in the upper fender 39, followed by firm fastening of associated nuts 53 onto those mounting screws 48 with washers 52 intervening between the nuts and the upper fender 39. By so doing, the first mounting tab 72 of the reinforcement member 70 is rigidly connected to the elongated flap body 60 and, at the same time, the elongated flap body 60 is fixed to the rear fender 27, which is the member of the vehicle body structure, particularly the rear frame 21. In other words, the elongated flap body 60 and the first mounting tab 72 of the reinforcement member 70 are concurrently fastened to the rear fender 27 by means of a first connecting member, on the right side of the vehicle body structure, comprised of the set of the mounting screws 48 and the corresponding nuts 53.

Also, the mounting holes 74 defined in the second mounting tab 73 of the reinforcement member 70 are positioned forwardly of, and aligned with the mounting holes 64*a* and 65*a*, defined respectively in the license plate mount 64 and the license plate mounting bracket 65, and the mounting screws 67 are subsequently passed from rear of the license plate mounting bracket 65 through the mounting holes 65*a* in the license plate mounting bracket 65, then through the mounting holes 64*a* in the license plate mount 64 and finally through the mounting holes 74 in the reinforcement member 70, followed by fastening corresponding nuts 69*a* from inside (a front side) of the second mounting tab 73 onto those mounting screws 67. By so doing, a lower end portion of the reinforcement member 70 and the license plate mounting bracket 65 are concurrently fastened to the license plate mount 64 as best shown in FIG. 3. As hereinabove described, the license plate 66 can be secured to the license plate mounting bracket 65 when the mounting screws 68 are passed successively through the mounting holes 66*b* and 65*a* and are then fastened with corresponding nuts 69*b*. In this way, the second mounting tab 73 at the lower end portion of the reinforcement member 70 can be secured to the elongated flap body 60 through a second connecting member comprised of the plural mounting screws 67 and the corresponding nuts 69*a* together with the license plate mounting bracket 65 used to support the license plate 66 that is a member independent of and separate from the fender flap 30.

According to the preferred embodiment of the present invention hereinabove fully described, since the elongated flap body 60 is reinforced by the reinforcement member 70 to have an increased rigidity, particularly that against the bending in a direction up and down, the fender flap 30 can be effectively prevented from swinging in a direction up and down. Also, since the reinforcement member 70 is formed independent of and separate from the elongated flap body 60, the possibility of formation of pull-ins due to shrinkage, which is often observed when the wheel fender flap is formed integrally with the reinforcement ribs as discussed hereinbefore, can advantageously be eliminated, allowing the wheel fender flap 30 to provide an appealing appearance. Considering that the elongated flap body 60 is reinforced by the reinforcement member 70, any elongated flap body having a relatively low rigidity can be utilized in the practice of the present invention, with the flexibility of design increased consequently.

Yet, since the reinforcement member 70 is secured to the elongated flap body 60 together with the license plate mounting bracket 65, on which the license plate 66 is mounted, by means of the mounting screw 67 and the corresponding nuts 69*a*, which form the second connecting member, component parts can be commonly shared with the number of component parts reduced consequently and, also, the structure can be simplified. Also, since the upper end portion of the reinforcement member 70 is secured to the rear fender 27 by the utilization of the first connecting members, that is, the mounting screws 48 and the corresponding nuts 53, used to secure the elongated flap body 60 to the rear fender 27, which is a member of the vehicle body structure, reduction of the number of component parts and simplification of the structure can further be reduced.

Figure 6:
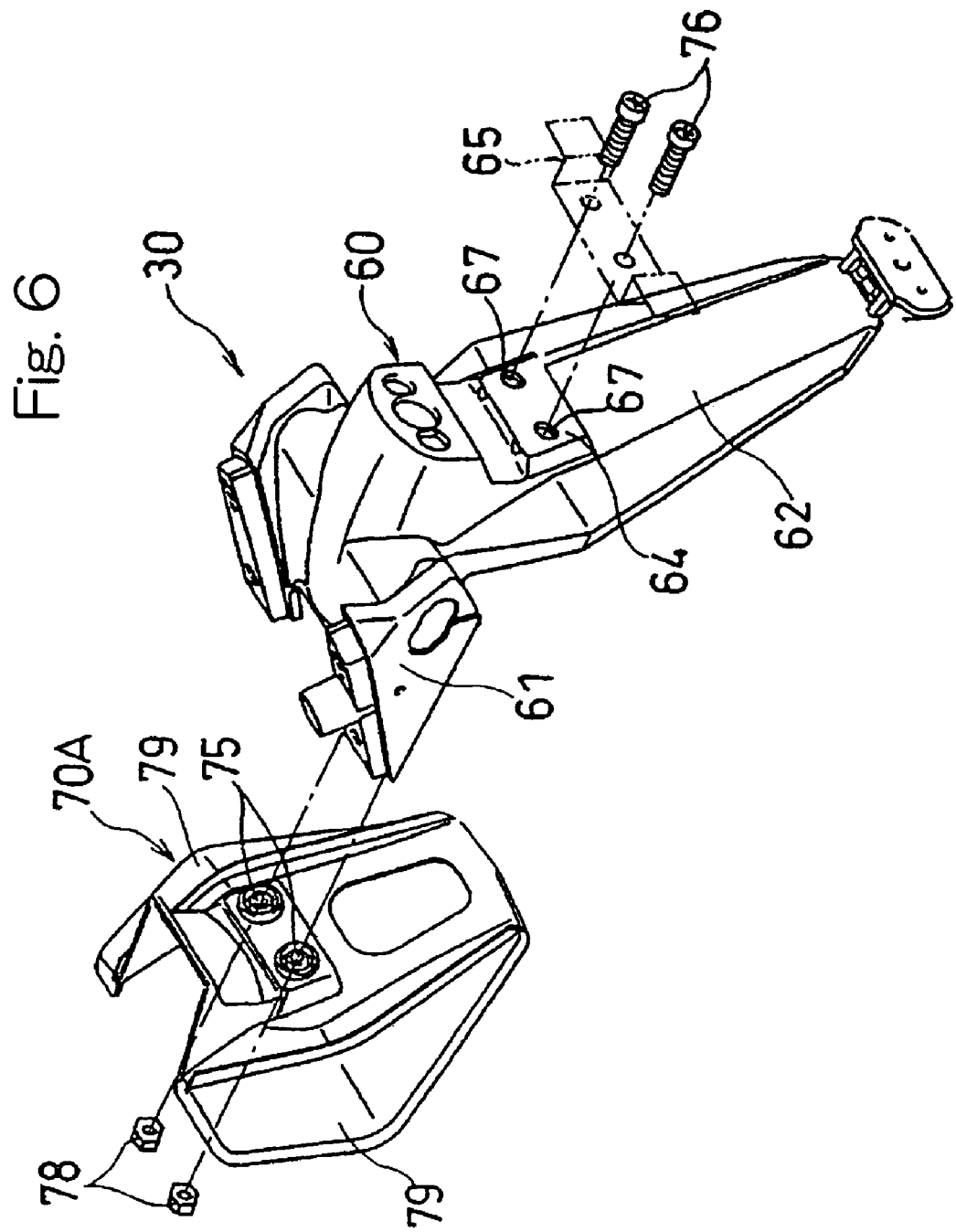
FIG. 6 is a perspective exploded view of the wheel fender flap according to another preferred embodiment of the present invention.

FIG. 6 illustrates an perspective exploded view of the reinforcement member employed in the practice of a second preferred embodiment of the present invention. In this second embodiment, a reinforcement member 70A, which is formed independent of and separate from the elongated flap body 60 is employed. This reinforcement member 70A is so shaped and so positioned as to be nested inside the elongated flap body 60 in tight contact with a front surface thereof. The reinforcement member 70A has two mounting holes 75 defined therein. When while the mounting holes 75 are aligned with the mounting holes 67 in the license plate mount 64, corresponding mounting screws 76 are passed from rear through those holes 75 and 67 and associated nuts 78 are fastened from front onto the mounting screws 76, the reinforcement member 70A is secured to the elongated flap body 60 together with the license mounting bracket 65 to thereby reinforce the elongated flap body 60. The reinforcement member 70A has a width greater than that of the generally downwardly extending major wall 62 of the elongated flap body 60 such that in a condition secured to the elongated flap body 60, opposite ear portions 79 and 79 of the reinforcement member 70A may protrude laterally outwardly from the major wall 62.

According to the second embodiment described hereinabove, the fender flap 30 is reinforced enough to suppress the swinging occurring during the drive of the motorcycle in a manner similar to that afforded by the previously described embodiment. Also, the possibility of formation of pull-ins due to shrinkage in the elongated flap body 60 can advantageously be eliminated, allowing the wheel fender flap 30 to provide an appealing appearance and the flexibility of design can also increase consequently. Yet, since the reinforcement member 70A is secured to the elongated flap body 60 together with the license plate mounting bracket 65, which is an example of a separate member, by means of the mounting screw 76 and the corresponding nuts 78, which form the same connecting member, component parts can be commonly shared with the number of component parts reduced consequently and, also, the structure can be simplified. Moreover, in the second embodiment, the reinforcement member 70A has a width greater than that of the major wall 62 of the elongated flap body 60, accompanied by enhancement of mud guard function.

It is to be noted that although in describing the first embodiment of the present invention with particular reference to FIG. 2, one end portion of the reinforcement member 70 has been shown and described as fitted to the elongated flap body 60 together with the license plate mounting bracket 65, which is a member independent of and separate from the fender flap 30, the opposite end portion of the reinforcement member 70 may be fitted to the elongated flap body 60 together with, for example, the license plate illuminator that is mounted in the illuminator mount 81.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A wheel fender flap for motor vehicles adapted to be arranged to confront a vehicle wheel, which flap comprises:
    a general elongated flap body supported by a member forming a rear fender assembly positioned above the vehicle wheel; and
    a reinforcement member separate from the elongated flap body, but fitted to the elongated flap body to reinforce the elongated flap body, wherein the reinforcement member is secured to a rear surface of the elongated flap body, that is positioned forwardly, relative to the vehicle body, of the elongated flap body.

2. The wheel fender flap as claimed in claim 1, wherein the reinforcement member has a connecting area at an upper end thereof, which area is connected to the elongated flap body by means of a first connecting member concurrently securing the elongated flap body to the member forming the rear fender assembly.

3. The wheel fender flap as claimed in claim 1 wherein the reinforcement member has at least one connecting area, the at least one connecting area being connected to the elongated flap body together with a separate component part by means of a second connecting member.

4. The wheel fender flap as claimed in claim 3, wherein the separate component part is a license plate positioned at a rear portion of the vehicle body structure.

5. A two-piece wheel fender flap assembly for a motorcycle comprising:
    a flexible synthetic resin rear wheel fender flap body;
    a reinforcement member connected to the rear wheel fender flap partially by a license plate to provide rigidity to the rear wheel fender flap; and
    at least one first fastener, wherein the reinforcement member is secured on an inside surface of the fender flap body and the license plate is mounted across an outside surface of the fender flap body opposite the securement of the reinforcement member and is supported by the same first fastener that secures the reinforcement member to the inside surface.

6. The two-piece wheel fender flap assembly of claim 5, wherein the reinforcement member has a connecting area at an upper end thereof, which area is connected to the fender flap body by a first connecting member concurrently securing the fender flap body to a vehicle body structure.

7. The two-piece wheel fender flap assembly of claim 5 wherein the reinforcement member has an elongated L-shape.

8. The two-piece wheel fender flap assembly of claim 5 wherein the reinforcement member is made from metal.

9. The two-piece wheel fender flap of claim 5 wherein the rear wheel fender flap body is secured to a rear fender assembly positioned above a rear vehicle wheel and a second fastener connects respectively one end of the reinforcement member and one end of the rear wheel flap to the rear fender assembly.

10. The two-piece wheel fender flap of claim 9 wherein the first fastener and second fastener are screws.

\* \* \* \* \*

UNITED STATES PATENT AND TRADEMARK OFFICE
CERTIFICATE OF CORRECTION

PATENT NO. : 7,641,238 B2  Page 1 of 1
APPLICATION NO. : 11/506558
DATED : January 5, 2010
INVENTOR(S) : Fujimoto et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 516 days.

Signed and Sealed this

Sixteenth Day of November, 2010

David J. Kappos
*Director of the United States Patent and Trademark Office*